United States Patent [19]

Kitazumi

[11] Patent Number: 5,642,137
[45] Date of Patent: Jun. 24, 1997

[54] COLOR SELECTING METHOD

[75] Inventor: Tadao Kitazumi, Kanagawa, Japan

[73] Assignee: Sony Corporation, Tokyo, Japan

[21] Appl. No.: 805,063

[22] Filed: Dec. 11, 1991

[30] Foreign Application Priority Data

Dec. 19, 1990 [JP] Japan .................. 2-411665

[51] Int. Cl.$^6$ .................................. G09G 5/06
[52] U.S. Cl. .................................. 345/199; 345/155
[58] Field of Search .................. 340/703, 701, 340/799; 358/75, 80; 345/199, 150, 153, 154, 155

[56] References Cited

U.S. PATENT DOCUMENTS

| | | |
|---|---|---|
| 4,689,669 | 8/1987 | Hoshino et al. |
| 4,697,176 | 9/1987 | Kawakami .................. 340/723 |
| 4,772,881 | 9/1988 | Hannah .................. 340/701 |
| 4,818,879 | 4/1989 | Manson .................. 340/703 |
| 4,857,901 | 8/1989 | Lathrop .................. 340/703 |
| 4,941,038 | 7/1990 | Walowit .................. 358/75 |
| 5,089,899 | 2/1992 | Nomura et al. .................. 358/335 |

*Primary Examiner*—Xiao Wu
*Attorney, Agent, or Firm*—Limbach & Limbach L.L.P.

[57] ABSTRACT

A method for color selection is proposed in which interchangeability between color palettes of a predetermined number of colors for color expressions of a color image and extended color palettes with an increased number of colors is maintained. A color space is divided into $\underline{n}$ regions D1 . . . Dn corresponding to the number of colors $\underline{n}$ of pre-extension color palettes for corresponding to $\underline{n}$ palette number groups of the extended color palettes. Each of these regions D1 . . . Dn is subdivided into $\underline{m}$ sub-regions D1(1) to D1(m), . . . , Dn(1) to Dn(m) corresponding to an extended color number $\underline{mn}$ for association with $\underline{mn}$ palette numbers of the extended color palettes.

19 Claims, 7 Drawing Sheets

COLOR SELECTING METHOD

BACKGROUND OF THE INVENTION

This invention relates to a method for a color selection for color palettes for color expressions of color or images. More particularly, it relates to a method for a color selection in cases wherein the numbers of colors of color or palettes are changed stepwise.

As techniques for realization of digital color images for e.g. computer graphics, there are known a so-called full-graphics system in which the colors of the pixels are expressed using three color data of red(R), green(G) and blue(B), and a multicolor expression system in which a certain number of, for example, 16, colors are previously selected from a large number of selectable colors, such as 4,096 colors, for so-called color palettes, and expression of color or images is achieved using only these selected colors. The multicolor expression system by the color or palettes has many advantages, such as a reduced number of bits of color or data for pixels as compared to the number of selectable colors, and reduced hardware cost and size.

Specifically, if four bits each are allocated to three color or data of R, G and B, the number of expressible colors is $2^4 \times 2^4 \times 2^4 = 4096$ colors, while 12 bits are required as a color code for expressing a desired color. Thus, the desired 16 colors are selected from the 4096 colors to provide 16-color color palettes, and one of 16 color palette colors is expressed using four bits each for each pixel. Although the number of colors simultaneously selectable in one full picture of color images is 16, these 16 colors may be selected freely from the 4096 colors. The 4-bit numbers designating one of the 16 colors of the color palettes, or color numbers, and the 12-bit color codes, indicating to which of the 4096 colors the color numbers correspond, are grouped together in a so-called color lookup table. Although the color look-up table in the present example has a capacity of $4 \times 16 + 12 \times 16 = 32$ bytes, it is apparent that the capacity of the image data in their entirety may be markedly reduced in consideration that 12 bits required for each pixel may now be reduced to four.

When the above described multicolor expression system by the color palettes is accepted as a standard for digital color image data recorded on a recording medium, a data format within a graphics device or in a data transmission format, the numbers of selectable colors or the numbers of color palette colors are usually set to predetermined values. If it is desired to extend the color palettes set by the prescribed standards in accordance with extension formats or upper order standards for increasing the number of the selectable colors or the number of color palette colors, with a view to improving the quality of color expressions in color images, there is presented a problem of interchangeability with the existing standards.

Specifically, if the 16/4096 format in which 16 colors are selected from the selectable 4096 colors for color palettes for color expressions is to be extended to, for example, a $256/2^{18}$ format in which 256 colors are selected from $2^{18}$ (about 260,000) colors, it may occur frequently that, if the image data formulated in accordance with the 16/4096 format are to be expressed in colors in accordance with the $256/2^{18}$ format or, conversely, the image data formulated in accordance with the $256/2^{18}$ format are to be expressed in colors in accordance with the 16/4096 format, the colors displayed differ markedly from the colors of the original image.

OBJECTS AND SUMMARY OF THE INVENTION

It is therefore an object of the present invention to provide a method for a color selection in a multicolor expression system using color palettes, high interchangeability may be maintained between color image data of the original lower order format and color image data of the extended format in which the number of selectable colors and the number of palette colors are increased and the software for the lower order format is not wasted.

It is another object of the present invention to provide a method for a color selection in a multicolor expression system using color palettes, according to which according to which effective color expressions may be assured even in cases wherein the image data of the extended upper order format are expressed in color by the lower order formats.

In accordance with the present invention, there is provided a method for a color selection in which a predetermined number of colors are selected from a large number of selectable colors for color palettes used for specifying said predetermined number of colors used for color images, and in which the so-selected colors are allocated to respective palette numbers, wherein, when said color selection is performed for extension color pallets having a number of extension colors at least larger than said predetermined number, palette numbers of said extension color palettes are distributed to each of said predetermined number of groups of palette numbers, said predetermined number of different regions are allocated in a color space to said groups of palette numbers, and wherein colors of corresponding color space regions are allocated to the palette numbers in said groups of palette numbers.

By associating palette numbers of pre-extension color palettes in this manner with the above mentioned groups of palette numbers of the extension color palettes, the image data of one format may be expressed in color by the color palettes of the other format, so that interchangeability may be maintained between the formats.

DESCRIPTION OF THE PREFERRED EMBODIMENTS

Figure 1A:
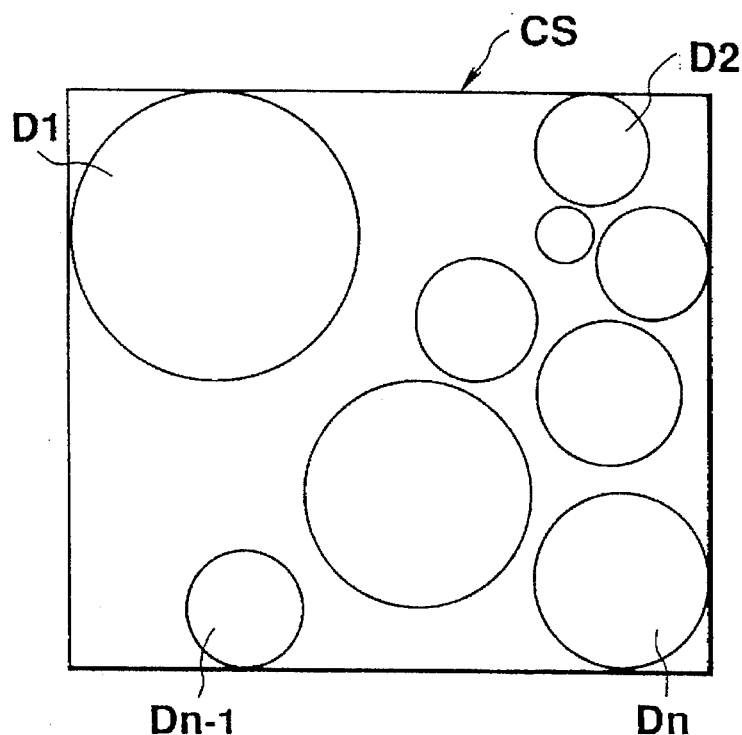
FIGS. 1A and 1B are diagrammatic views for illustrating the basic concept of the method for color selection according to the present invention.
Figure 1B:
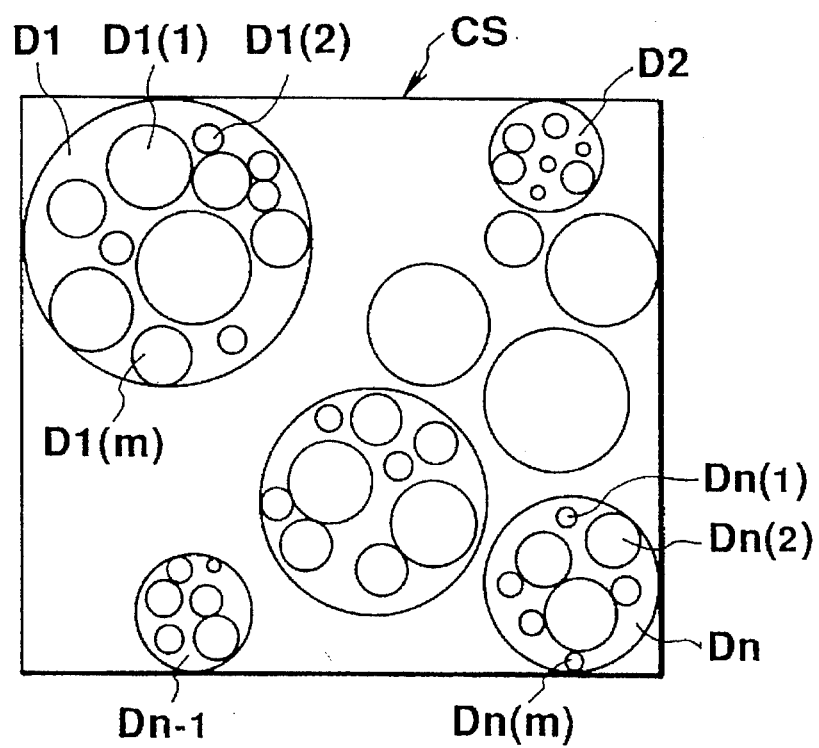

FIG. 1 is a schematic view for illustrating the basic concept of the method for color selection according to the present invention. Referring to FIG. 1A, a color space CS in its entirety, expressing the colors of the color image, is divided into an n number of regions D1, ..., Dn, corresponding to the number of colors n of color palettes of a predetermined color expression format of color images, where n is an integer not less than 2. A typical color for each of these regions D1 to Dn, such as the color at the mid part of each region, is allocated to each of an n number of palette number groups of extension color palettes. Referring to FIG. 1B, each palette number group represents a set of an m number of palette numbers. Each of the regions D1 to Dn is then divided into an m number of sub-regions D1(1) to D1(m), ... ,Dn(1) to Dn(m) corresponding to the number of colors mn of the extension color palettes, with the typical colors of these mn number of sub-regions being allocated to respective palette numbers in each of the palette number group.

When the color image data of the extension color palettes, for which color selection has been made as described above, with the number mn of the selected colors, are to be expressed in color by the pre-extension color palettes, with the number n of colors, color expression with n colors may be made effectively by associating the n palette number groups of the extension color palettes with the palette numbers of the pre-extension color palettes. Conversely, when color image data is obtained using the pre-extension color palettes by the extension color palettes, color expressions may be made effectively using the n colors among the expressible mn colors, if the palette numbers of the pre-extension color palettes are associated with the palette number groups of the extension color palettes and typical colors for each of the regions D1 to Dn are displayed.

If $n=2^N$ and $m=2^M$, where N and M are natural numbers since the color code for specifying one of n colors is represented by N bits and the color code for expressing one of mn colors is represented by (M+N) bits, the palette numbers of the pre-extension color palette may be represented by N bits and the palette number of the extended color palette may be expressed by (M+N) bits. Consequently, if the color space in its entirety is divided into n regions D1 to Dn, so that the palette number groups are represented by the upper order N bits of the (M+N) bits indicating the palette numbers of the extension color palettes, and if each of the regions D1 to Dn is divided into m sub-regions by the lower M bits, color expressions may be made by the pre-extension color palettes using only the N bits, while color expressions by the extension color palettes may be made using the (M+N) bits.

In the embodiment shown in FIG. 1A and 1B, color selection in two stages (one time of color extension) has been explained. However, color selection may also be made in three stages (two times of color extension). This may be easily achieved by further dividing the sub-regions D1(1) to D1(m), ... Dn(1) to Dn(m) and increasing the number of bits indicating the palette numbers further towards the lower order. The number of selectable colors may be the same or different before and after extension. If different numbers of colors are used, the number of selectable colors before extension may be 4096 and 16 colors (expressed by 4-bit palette numbers) may be selected for the color palettes, while the number of selectable colors after extension may be $2^{18}$ and 256 colors (expressed by 8-bit palette numbers) may be selected for the extended color palettes. The number of selectable colors after extension may be the same as that before extension, that is, 4096.

An embodiment of the present invention will be hereinafter explained, in which the present invention is applied to color selection under the standards for TV graphics of a so-called CD (compact disc) graphics. This CD graphics is known as being a so-called 16/4096 format in which the color image is represented using 16 color palette colors out of the 4096 colors. The method for color selection is hereinafter explained, in which the above format may be interchanged with a $256/2^{18}$ format in which 256 colors are selected from $2^{18}$ colors (about 260,000 colors).

With the CD graphics, graphic representation is performed using 6-channel subcode data of R to W channels acording to the CD standard. With the data recorded on the CD, each frame is constituted by 588 channel bits and each block or subcode frame is constituted by 98 frames. Since the subcoding for the leading two frames of the block is the synchronizing pattern, the eight channels P to W of the subcode data are constituted by the subcode data of the remaining 96 frames. Of these, the P channel (96 bits/block) and the Q channel (96 bits/block) are used for locating errors or information concerning the recorded tune and the remaining six channels (channels R to W) are used as data for CD graphics.

Figure 2:
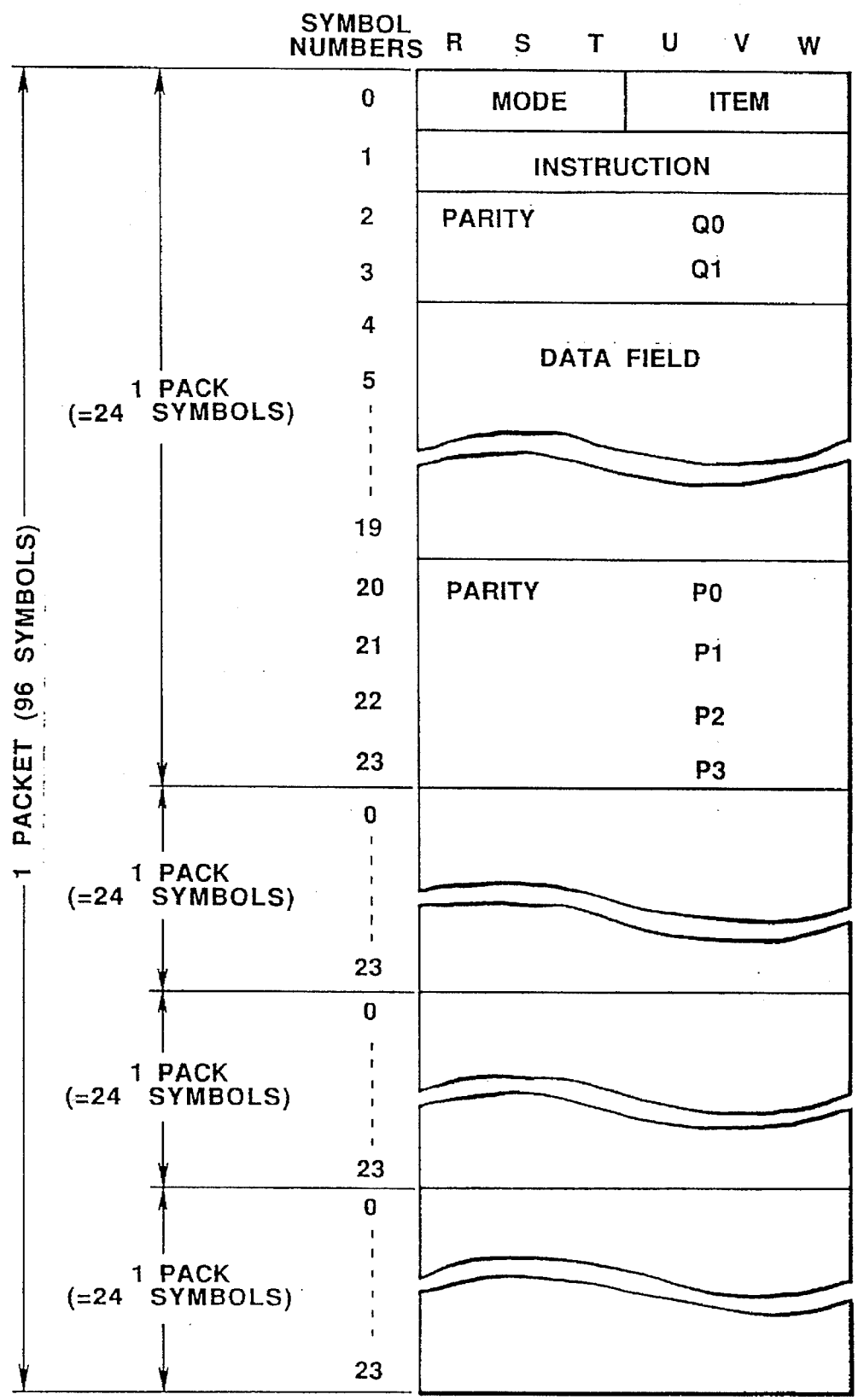
FIG. 2 is a diagrammatic view for illustrating a format of Cd subcode data.

FIG. 2 shows 96 symbols for one block (one subcode frame) of the channels R to W of the subcode data. These 96 symbols are termed a packet consisting of four packs each consisting of 24 symbols. Symbol numbers 0 to 23 are affixed to the 24 symbols of one pack with the first symbol 0 indicating a command symbol, the three bits R, S and T indicating modes and the three bits U, V and w indicating items. The next symbol 1 is allocated to instructions, the symbols 2 and 3 are allocated to parities Q1 and Q2 and the symbols 4 to 19 are allocated to a data field. The symbols 20 to 23 are allocated to parities P1 to P3. The above also applies to any of the four packs of the packet.

Among the CD graphics are a line graphics and a TV graphics.

Figure 3:
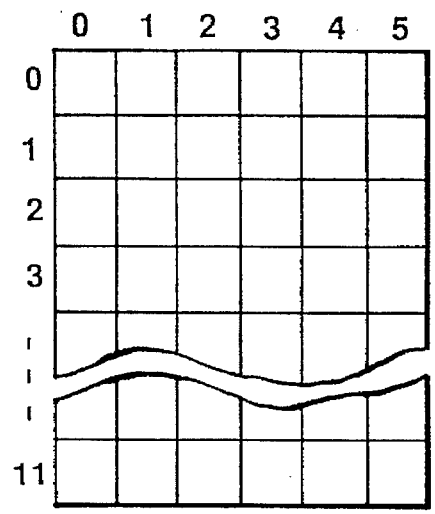
FIG. 3 is a plan view showing a font of CD graphics.
Figure 4:
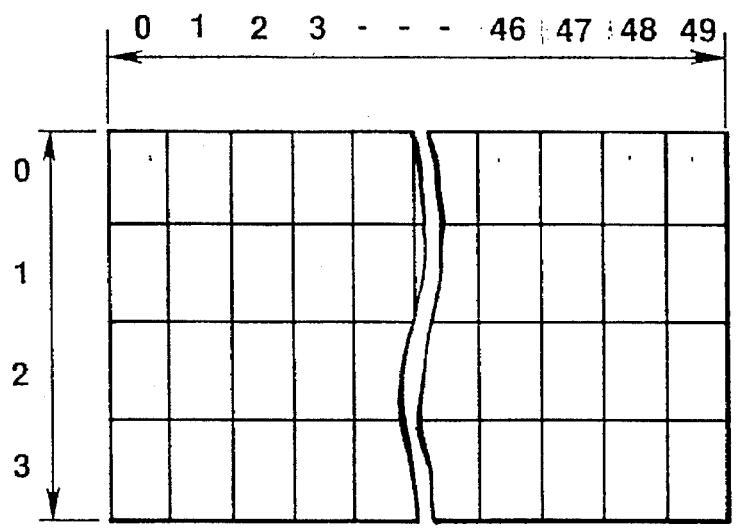
FIG. 4 is a plan view for illustrating line graphics for CD graphics.
Figure 5:
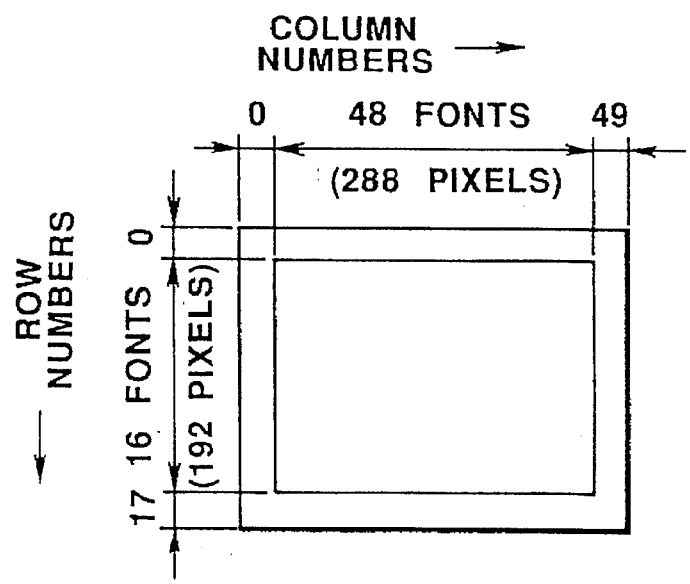
FIG. 5 is a plan view showing a font arraying pattern for TV graphics for CD graphics.

Turning first to line graphics, and referring to FIG. 4, a 4 by 50 array of fonts or character indicating units, each composed of 6×12 pixels, as shown in FIG. 3, is used mainly for indicating strings of letters or characters for a text of songs, lyrics or the like. With the instructions of the symbol 1 of the pack shown in FIG. 2, these fonts may be flashed or moved up, down, leftwards or rightwards by scrolling commands.

Figure 6:
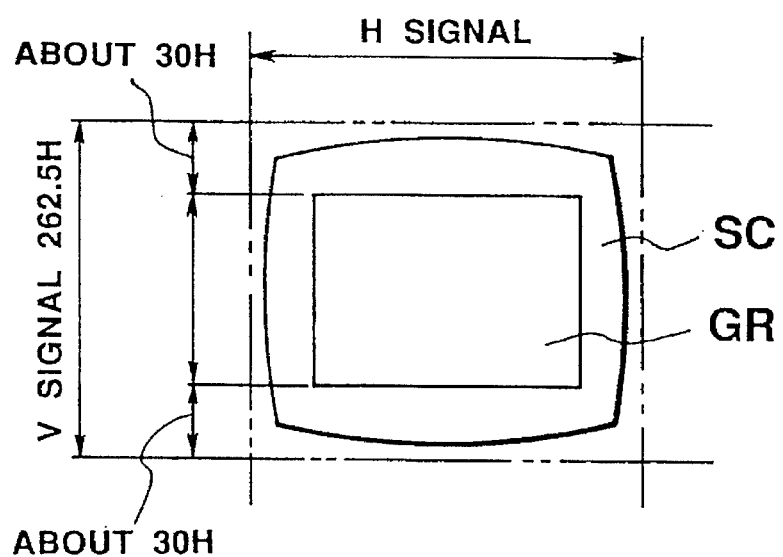
FIG. 6 is a schematic plan view showing a display screen of TV graphics for CD graphics.

In the case of the command symbol mode 1 of the symbol 0 of FIG. 2, the TV graphics is indicated. With the TV graphics, the fonts shown in FIG. 3 are arrayed in 18 rows and 50 columns. However, the peripheral two rows and two columns are reserved as a border area or so-called scrolling area and are not used for dynamic visual display, although prsetting with a sole color is feasible. Thus the graphic display is confined within an area formed by the inner 16×48 fonts. In terms of pixels, this area is defined by 192×288 pixels. FIG. 6 shows a display configuration on a screen SC of a CRT (cathode ray tube) monitor. Display is performed while the vertical and horizontal synchronization signals are timed so that a graphic display area GR is located at the middle of the screen SC. With the above described TV graphics, write font, soft scroll, preset or the like may be commanded by the instructions of the symbol 1 of FIG. 2. Using these instructions, a full picture on a screen is formed at an interval of ca. 2.5 seconds, and color expressions may be made while 16 colors are selected for the palettes from the 4096 selectable colors.

Figure 7:
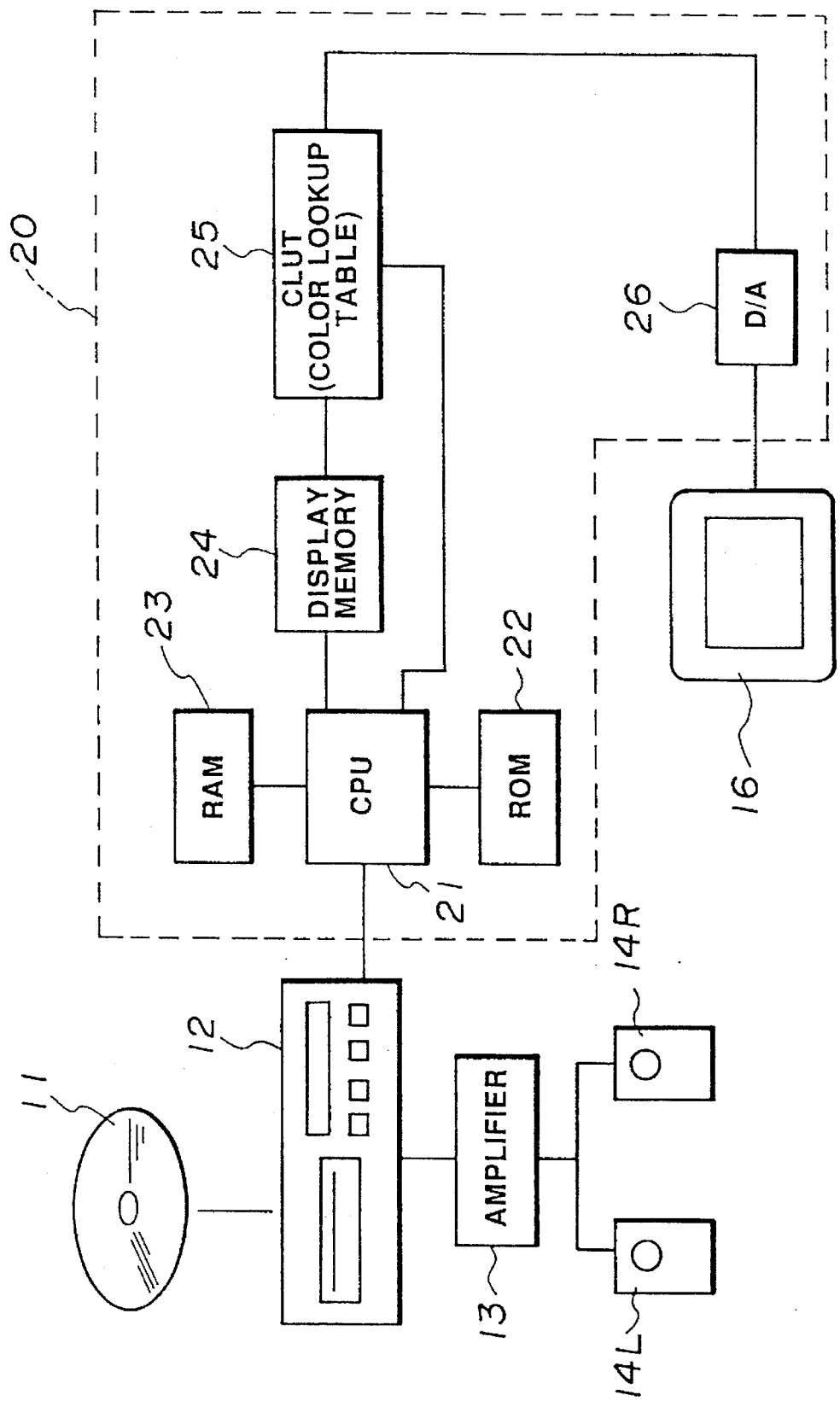
FIG. 7 is a block diagram showing an example of a hardware construction for data reproduction for CD graphics.

FIG. 7 is a block diagram for illustrating the schematic construction of a hardware. In this figure, a compact disc (CD) on which there are prerecorded data for CD graphics, i.e. (subcode data of R to W channels) is reproduced by a CD player 12 fitted with a subcode output terminal. Audio signals are amplified by an amplifier 13 and transmitted to left and right speakers 14L and 14R. Subcode data from a subcode output terminal of the CD player 12 are transmitted to a CPU 21 (central processing unit such as a microcomputer). A read-only memory (ROM) 22 in which a program is written and a rewritable random access memory (RAM) 23 are connected to the CPU 21 and display data obtained by CPU 21 are written in a display memory (image memory) 24. A color palette number is specified for each pixel, for example, of the display data, so that color or image data are formed by displaying the color corresponding to the palette number, that is, one of the 16 colors selected from the 4096 colors, for each pixel by means of a color or lookup table (CLUT) 25 associated with the color palettes. The color image data are converted by D/A into converter 26 into analog color or image data which are transmitted to a color CRT (cathode ray tube) monitor 16 for displaying a color image.

It is assumed that the color palette standard (16/4096 format) of the above described conventional CD graphics is extended to a 256/$2^{18}$ format in which 256 color are selected from $2^{18}$ colors (about 260,000 colors) in which 6 bits each are allocated to the three colors of R, G and B. The palette numbers 0 to 255 corresponding to the extended number 256 of the colors are indicated by 8-bit binary numbers. The eight bits of the palette numbers are divided into upper four bits and lower four bits and the upper four bits are used for specifying the palette number groups. There are 16 palette number groups each containing 16 palette numbers specified by the lower four bits. Each of 16 regions in the color or space is allocated to each of 16 palette number groups. The color space herein means a three-dimensional space defined by a red(R) axis, a green(G) axis and a blue(B) axis. Within this three-dimensional space, there are provided 16 rectangular regions each associated with one of the palette number groups. These 16 regions are preferably so selected that color expressions of the original color image may be made optimally and for interchangeability with the 16/4096 format in consideration that these 16 regions encompass the 4096 dense sub-regions. The colors within each region corresponding to one palette number group are allocated to the palette numbers of the palette number group. That is, there are 16 palette numbers in one palette number group and the 16 colors within the same region are allocated to these palette numbers. Since these 16 colors are among the $2^{18}$ colors, and the 16 regions corresponding to the palette number groups are not overlapped with each other, a total of 256 colors may be selected from the $2^{18}$ colors with the 16 groups.

As to the relation between the pre-extension color image data (indicated by four bits per color on the full picture) and the post-extension color image data (indicated by eight bits per color on the full picture), if, with the above described color selection method, the upper four bits of the post-extension color image data are directly used as the pre-extension color image data, these four-bit data become the data specifying the palette number groups. Since these palette number groups are associated with the 16 regions of the 4096 dense sub-regions into which the color space in its entirety is subdivided, 16 colors may be selected from the 4096 selectable colors, which means that color expressions in accordance with the 16/4096 format may be achieved satisfactorily with improved interchangeability.

The sequence of color selection will be explained by referring to FIG. 8.

Figure 8:
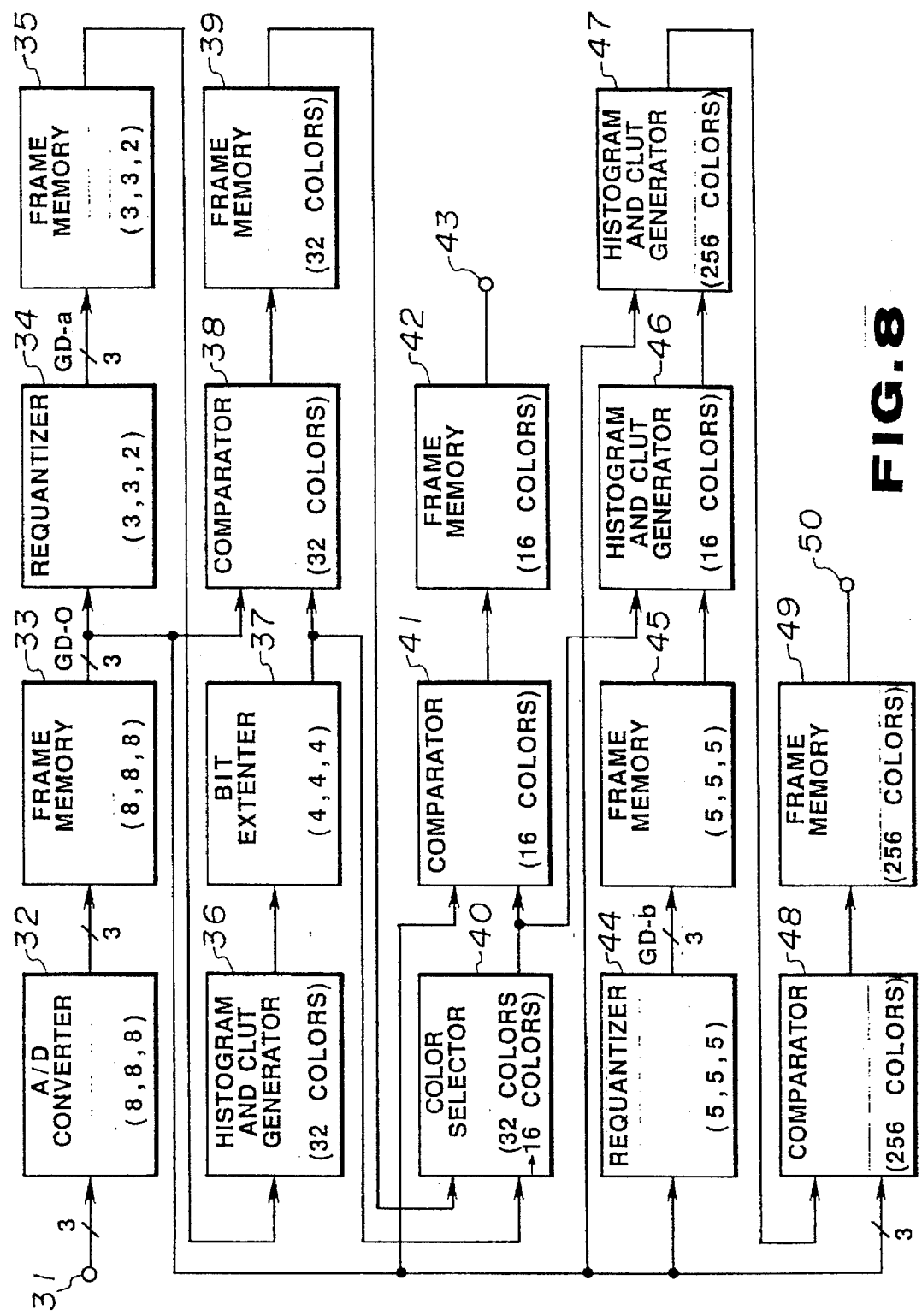
FIG. 8 is a block circuit diagram showing an embodiment of the method for color selection according to the present invention.

Three analog color signals (R, G and B signals) are supplied to an input terminal 31 in FIG. 8 and converted by an A/D converter 32 into e.g. 8-bit R, G and B signals, so as to be written in a frame memory 33 as 24-bit-per-pixel original digital image data GD-O. The number of bits of the color data R, G and B of the color image data are expressed hereinafter as (R, G, B)=(8, 8, 8).

The 8 bits×3/pixel data for the totality of the pixels in the frame memory 33 are again transmitted to a requantizer 34 for reducing the number of bits for each of the R, G and B color signals by rounding for producing e.g. 256 color image data GD-a. For reducing the numbers of bits (R, G, B)=(8, 8, 8) of the original digital color data GD-O, it suffices to use only e.g. (3, 3, 2) bits from the upper order side of the 8-bit R, G and B data. In the present case of requantization into (R, G, B)=(3, 3, 2) bits, the number of bits per pixel becomes 8, so that 256 color expressions become possible. A variety of Other combinations are possible for the number of bit reduction of the R, G and B data at the time of requantization. For example, it is possible to provide 64 color expressions by setting reducing the number of bits per pixel to 6 by (R, G, B)=(2, 2, 2), 128 color expressions by reducing the number of bits per pixel to 7 by (R, G, B)=(3, 2, 2) or (2, 3, 2) or 512 color expressions by reducing the number of bits per pixel to 9 by setting (R, G, B)=(3, 3, 3). Any one of these requantization techniques may be adaptively selected in consideration of the properties etc. of the original color image. As to the proportions of the bits of the (R, G, B) data, it is most reasonable that, since the luminance signals of the color image signals is expressed approximately by 0.3R+ 0.6G+0.1B, the bit allocation be made so that the number of bits of the R data is maximum, followed by that of B data, with the number of bits of G data being the least of the three color data. Bit allocation may also be made in dependence upon the color tone of the original image, as by using the maximum number of the B data if the input color image is generally bluish in color tone.

The color image data GD-a, outputted with bit reduction by the requantizer 34, such as the 8-bit-per-pixel data by (R, G, B)=(3, 3, 2), are written into a frame memory 35.

Figure 9:
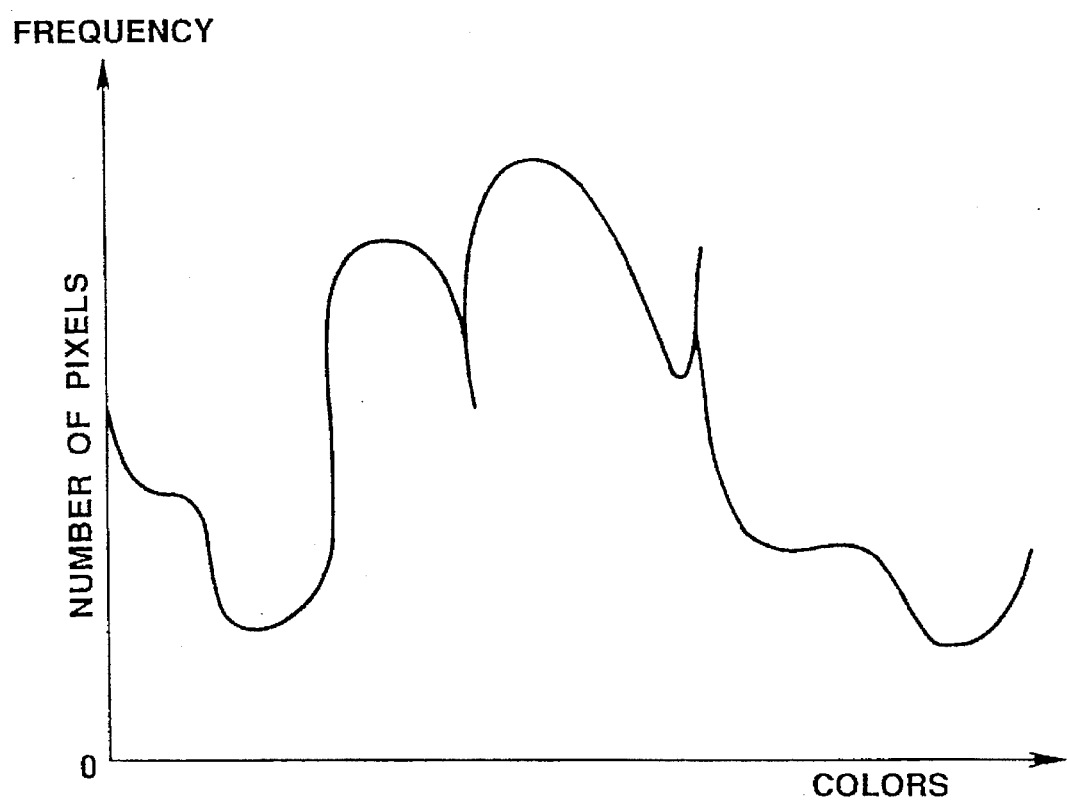
FIG. 9 is a graph showing an example of a histogram.

The color image data GD-a from the frame memory 35 are supplied to a histogram-CLUT (color lookup table) generator 36. This histogram-CLUT (color lookup table) generator 36 provides a histogram (frequency chart) showing the number of pixels for each of the 256 typical colors of the color image data GD-a that is the frequency of occurrence of each color, as shown in FIG. 9, and selects e.g. 32 colors in the sequence of decreasing frequency from the highest frequency (maximum frequency or peak value) for formulating a color lookup table (CLUT) for contrasting the 5-bit addresses for the 32 colors with the above mentioned 8-bit color data.

The color lookup table data for the generator 36 are transmitted to a bit extender 37 for bit extension to 12-bit color data (4, 4, 4) in which 4 bits are used each for the R, G and B colors. This takes account of the 4096 selectable colors of the 16/4096 selectable colors. In the CLUT, extension colors in which the 4096 colors are indicated by 12 bits are associated with the 5-bit addresses for the 32 colors. An example of a variety of bit extension methods is hereinafter explained.

In this example, the above mentioned 8-bit color data of (R, G, B)=(3, 3, 2) is extended to 12-bit color data of (R,G, B)=(4, 4, 4). The original digital image data GD-O from the frame memory 33, that is the pixel data (R, G, B)=(8, 8, 8), are requantized so that 4 bits each are taken out from the upper order bits for rounding to give the bit numbers (R, G, B)=(4, 4, 4). A histogram is then formulated, for each of the 32 colors obtained by the histogram-CLUT generator 36, by means of the above (R, G, B)=(4, 4, 4) pixel data having the eight upper order bit pattern. This operation is performed for each of the 32 colors. At this time, 12-bit color data capable of indicating 4096 colors and the frequency of occurrences of the pixels of the colors are plotted on the abscissa and the ordinate of the histogram, respectively. A color with the maximum occurrence (one of the 4096 colors indicated by 12 bits) of each of the 32 histograms is selected. In this manner, bit extension from (3, 3, 2) to (4, 4, 4) is performed.

The CLUT data from the bit extender 37, extended to (4, 4, 4), are transmitted to a comparator 38 where they are compared with the original digital image data GD-O from frame memory 33 so that the CLUT data of the closest color are selected for each pixel. For such comparison, it is necessary that the above (4, 4, 4) CLUT data be further bit extended to (8, 8, 8). However, for such bit extension, it is only necessary to add 4 bits of 0 to the lower order sides of the 4-bit R, G and B data. In this manner, a CLUT with color data or color codes of (8, 8, 8) bits and 5 address bits (for 32 colors) is obtained. The distances on the color space between the 32 CLUT color codes and the (8, 8, 8) color data for each pixel of the original digital image are calculated and 5 bits which will become the address of a color code which will give the least of the above calculated 32 distances is adopted as data for specifying the color of the pixel. The above operation is performed for each of the pixels on the full picture and the 5-bit CLUT addresses for the pixels are written in frame memory 39.

The data from frame memory 39 are transmitted to a color selector 40 for selecting 16 colors from the 32 colors. To this end, histograms showing the frequency of the CLUT data allocated to the pixels on the full picture are prepared and 16 colors are sequentially selected from the side of the maximum number of the pixels. In this manner, a CLUT in which inappropriate colors are eliminated from the 32 colors so that ultimately 16 colors are selected each of which specifies one of 4096 colors, that is a CLUT with a 4-bit address and 12-bit color code ((R, G, B)=(4, 4, 4))is produced.

The (4, 4, 4) CLUT data for 16 colors from color selector 40 are transmitted to a comparator 41 and compared with the (8, 8, 8) original digital image data from frame memory 33 so that the CLUT data having the closest color is selected for each pixel. During this comparison, as in the case of comparison by the comparator 38, the (4, 4, 4) CLUT data are converted to color code data (8, 8, 8) by bit extension, such as by annexing four 0 bits to the lower order sides of the (4, 4, 4) data. A color code which is closest, that is, has the minimum distance, on the color space, is calculated for each pixel of the full picture, and an 4-bit address corresponding to the color code is written for each pixel in the frame memory 42. This 4-bit address corresponds to the palette number of the color palettes in the 16/4096 format so that one of 4096 colors may be specified by the corresponding color code. Thus, with the color image data taken out of the frame memory 42 via output terminal 43, color designation by the color palettes similar to the 16/4096 format has been made for each pixel of the full picture.

For producing color image data and color palettes of the above mentioned $256/2^{18}$ format, the (R, G, B)=(8, 8, 8) original digital image data GD-O from frame memory 33 are transmitted to a requantizer 44 for bit reduction (rounding) to e.g. (R, G, B)=(5, 5, 5) for producing a bit-reduced color image data GD-b. To this end, it suffices to take out 5 upper order bits of the original R, G, B color data of the original digital color data GD-O. The number of reduced bits at the time of the requantization may be adaptively changed in the range of from (4, 4, 4) to (5, 5, 5) as desired and preferably in accordance with the properties and characteristics of the original image. The bit-reduced color image data GD-b from the requantizer 44, for example, 15-bit per pixel (5, 5, 5) data, are written in a frame memory 45.

The (5, 5, 5) color image data GD-b from frame memory 45 are transmitted to a histogram-CLUT generator 46. This histogram-CLUT generator 46 formulates 16 histograms with input (5, 5, 5) color image data GD-b for the (4, 4, 4)16 color data selected at the color selector 40. In the case of the above (5, 5, 5) data, the number of colors on the abscissa of a histogram designated by the above (4, 4, 4) data is 32768 and the frequency of occurrences (numbers of pixels) for these colors is plotted on the ordinate. This is tantamount to preparing histograms for all of the pixel data of the color image data GD-b in association with the colors designated by the above (5, 5, 5) data within the region of each of the 16 colors selected by color selector 40. For each of the 16 histograms, prepared in this manner, 16 colors showing the maximum frequency of ocurrences are selected, so that a sum total of 256 colors are selected. The CLUT is a lookup table having the eight bits for identification of these 256 colors as addresses and having the (5, 5, 5) or 15 bits as the color code, which represents bit extension of the (4, 4, 4)color code for the 16 colors selected by the color selector 40.

The (5, 5, 5) data for 256 colors from the histogram-CLUT generator 46 are transmitted to a next following histogram-CLUT generator 47. For each of the 256 colors from the histogram-CLUT generator 46, the histogram-CLUT generator 47 prepares a histogram with those data of the pixel data of the above (8, 8, 8) original color image data GD-O in which the upper order bits are in common with the (5, 5, 5) data. A separate histogram is prepared for each of the 256 colors. For each of these 256 histograms, a color exhibiting the maximum frequency of occurrence is selected for preparing 16×16=256 color (8, 8, 8) data. Each of the (8, 8, 8) data produced in this manner represents one of $2^{24}$ (=16777216) selectable colors. The respective lower order 2 bits are eliminated from the selected 256 color (8, 8, 8) data to give (6, 6, 6) data to provide $2^{18}$ or about 260,000 selectable colors in accordance with the $256/2^{18}$ format. Thus the ultimately prepared color lookup table (CLUT) corresponds to the above mentioned extension color palettes in which the address corresponding to the palette numbers are 8-bit addresses for specifying one of 256 colors and the color code is the (6, 6, 6) 18-bit color code for indicating one of $2^{18}$ selectable colors.

It is noted that the method for forming the ultimate 256 (6, 6, 6) data is not limited to the above described embodiment. For example, the 256 (6, 6, 6) color codes may be obtained by reducing the bits to (6, 6, 6) by requantization by requantizer 44, preparing 16-color histograms (16 histograms) with the bit-reduced (6, 6, 6) data for the pixels designated by the 16-color (4, 4, 4) data selected by color selector 40, and by selecting 16 colors from the upper order frequency color for each of the histograms.

The 256-color (6, 6, 6) color data from the histogram-CLUT generator 47 are transmitted to a comparator 48 where they are compared with the original digital image data GD-O from frame memory 33 and CLUT data having the closest color are selected for each pixel. For such comparison, two 0 bits are annexed to the lower order sides of the 256 (6, 6, 6) CLUT color data from generator 47 to produce apparent (8, 8, 8) data, and the distance on the color space between the 256-color (8, 8, 8) data and (8, 8, 8) color data of each pixel of the original digital image is calculated. The 8 bit data which becomes an address of a color code which will give the smallest distance among the 256 distances is accepted as the data for color designation for the pixel. This operation is performed for each pixel of the full picture on the screen and the 8-bit CLUT address is written in a frame memory 49 from one pixel to another. The color image data taken out of the frame memory 49 by means of an output terminal 50 are in the state in which color designation by extension color palettes similar to the 256/2$^{18}$ format has been made for the totality of the pixels of the full picture on the screen.

If it is desired to make color expressions of the 8-bit-per-pixel color image data from the output terminal 50 in accordance with the pre-extension 16/4096 format (4-bit-per-pixel format), the upper order 4 bits of the 8-bit data for each pixel may be used directly as the 16-color palette numbers, while the upper order 4-bit (4, 4, 4) data of the (8, 8, 8) CLUT data may be used as the color codes for designating the 4096 colors. At this time, color expressions may be made by the 16 colors selected by the histogram-CLUT generator 46. These 16 colors, which are the same as the 16 colors of the (4, 4, 4) data from the color selector 40, become the same as the color image data taken out at output terminal 43 to provide for extremely high interchangeability.

The present invention is not limited to the above described embodiment. For example, although the regions D1 to Dn of FIG. 1 are divided by the same number m, they may also be divided by numbers variable from region to region. Color extension may be effected two or more times so that color selection may be made for three or more stages of color palettes. The numbers of colors, the numbers of selectable colors or the data bit numbers may be optionally set without being limited to those given in the preceding embodiment.

What is claimed is:

1. A method for a color selection in which, when color palettes for designating colors of a digitized color image are formed by selecting a first predetermined number of colors from a large number of selectable colors and by allocating the so-selected colors to respective palette numbers, color selection is performed for extension color palettes having a second predetermined number of extension colors larger than said first predetermined number, comprising dividing a palette number of each of said extension color palettes into a number of palette number groups equal to said first predetermined number, allocating a number of color space regions in a color space equal to said first predetermined number of groups to said palette number groups, and allocating colors in said color space regions to palette numbers in said palette number groups for forming said extension color palettes.

2. A method for color selection as claimed in claim 1 wherein allocation of said color space regions to said palette number groups is performed in accordance with the frequency of occurrences of colors.

3. A method for color selection as claimed in claim 1 wherein allocation of color space regions to said palette numbers in said palette number groups is performed in accordance with the frequency of occurrences of colors in said color space regions allocated to said palette number groups.

4. A method for a color selection in which, when color palettes for designating digital color image data for a plurality of pixels are formed by selecting a first predetermined number of colors from a large number of selectable colors and by allocating the so-selected colors to respective palette numbers, color selection is performed for extension color pallets having a second predetermined number of colors larger than said first predetermined number, comprising bit-reducing original color image data (R, G, B) to (R$_1$, G$_1$, B$_1$), where R, G, B denote a number of bits of the original color image data, selecting said first predetermined number of colors in accordance with the frequency of occurrences of (R, G, B) having said (R$_1$, G$_1$, B$_1$) as an upper bit pattern, and selecting a predetermined number of colors in accordance with the frequency of occurrence of said color image data (R, G, B) for each of regions designated by the selected first predetermined number of colors for selecting a second predetermined number of colors.

5. A method for color selection as claimed in claim 4 wherein, after selection of said first predetermined number of colors, the respective pixels of said original color image data (R, G, B) are allocated to said first predetermined number of colors.

6. A method for color selection as claimed in claim 4 wherein an RGB distance between each pixel of said original color image data (R, G, B) and each color of said first predetermined number of colors is found and each pixel of said original color image data (R, G, B) is allocated to a color corresponding to a minimum RGB distance.

7. A method for color selection as claimed in claim 4 wherein the original color data (R, G, B) is bit-reduced to (R$_2$, G$_2$, B$_2$) and wherein a predetermined number of colors is selected for each of the regions designated by the selected first predetermined number of colors in accordance with the frequency of occurrence of said (R$_2$, G$_2$, B$_2$) for selecting said second predetermined number of colors.

8. A method for color selection as claimed in claim 4 wherein, after selection of said second predetermined number of colors, the respective pixels of said original color image data (R, G, B) are allocated to the colors of said second predetermined number of colors.

9. A method for color selection as claimed in claim 5 wherein an RGB distance between each pixel of said original color image data (R, G, B) and each color of said first predetermined number of colors is found and each pixel of said original color image data (R, G, B) is allocated to a color corresponding to a minimum RGB distance.

10. A method for a color selection in which, when color palettes for designating color image data of a plurality of pixels are formed by selecting a first predetermined number of colors from a large number of selectable colors and by allocating the so-selected colors to respective palette numbers, color selection is performed for extension color pallets having a second predetermined number of extension colors larger than said first predetermined number, comprising:

bit-reducing original color image data (R, G, B) to (R$_3$, G$_3$, B$_3$), where R, G, B denote the number of bits of the original color image data, selecting a third predetermined number of colors larger than said first predetermined number of colors in accordance with the frequency of occurrences of (R, G, B) having said (R$_3$, G$_3$, B$_3$) as an upper bit pattern, bit-expanding said (R$_3$, G$_3$, B$_3$) to said (R1, G1, B 1), allocating each pixel of said original color data (R, G, B) to colors of said third predetermined number of colors to thereby create an allocated number of pixels and selecting the colors of said first predetermined number of colors in accordance with the allocated number of pixels, and selecting a predetermined number of colors in accordance with the frequency of occurrence of said color image data (R, G, B) for each of regions designated by the selected colors of said first predetermined number of colors for selecting a second predetermined number of colors.

11. A method for color selection as claimed in claim 10 wherein the frequency of occurrence at each of the selected third predetermined number of colors of data obtained upon bit-reducing the original color image data (R, G, B) to said ($R_1, G_1, B_1$) and each one data having a maximum frequency of occurrence is found for each color for bit-expanding said ($R_3, G_3, B_3$) to said ($R_1, G_1, B_1$).

12. A method for color selection as claimed in claim 10 wherein an RGB distance between each pixel of said original color image data (R, G, B) and each bit-expanded color of said third predetermined number of colors is found and each pixel of said original color image data (R, G, B) is allocated to a color corresponding to a minimum RGB distance.

13. A method for color selection as claimed in claim 10 wherein, after selection of said first predetermined number of colors, the respective pixels of said original color image data (R, G, B) are allocated to colors of said first predetermined number of colors.

14. A method for color selection as claimed in claim 13 wherein an RGB distance between each pixel of said original color image data (R, G, B) and each color of said first predetermined number of colors is found and each pixel of said original color image data (R, G, B) is allocated to a color corresponding to a minimum RGB distance.

15. A method for color selection as claimed in claim 10 wherein the original color data (R, G, B) is bit-reduced to ($R_2, G_2, B_2$) and wherein a predetermined number of colors is selected for each of regions designated by the selected first predetermined number of colors in accordance with the frequency of occurrence of said ($R_2, G_2, B_2$) for selecting said second predetermined number of colors.

16. A method for color selection as claimed in claim 10 wherein, after selection of said second predetermined number of colors, the respective pixels of said original color image data (R, G, B) are allocated to colors of said second predetermined number of colors.

17. A method for color selection as claimed in claim 16 wherein an RGB distance between each pixel of said original color image data (R, G, B) and each of said first predetermined number of colors is found and each pixel of said original color image data (R, G, B) is allocated to a color corresponding to a minimum RGB distance.

18. A method for color selection in a multicolor expression graphics display system using color palettes in order to maintain high interchangeability between digitized color image data of an original lower order format and digitized color image data of an extended format in which the number of selectable colors and the number of palette colors are increased, comprising the steps of:

(a) dividing a color space into n regions (D1, D2, ... Dn), where n is an integer, corresponding to the number of colors of preextension color palettes for corresponding to n palette number groups of extended palettes; and (b) dividing each region (D1, ... Dn) into m subregions (D1(1), D1(2), ... D1(m), ... Dn(1), ... Dn(m)), where m is an integer, which correspond to an extended color number mn for association with mn palette numbers of the extended color palettes.

19. A method for color selection according to claim 18 wherein the step of dividing the color space includes the step of dividing the color space region into number groups in accordance with the frequency of occurrence of colors in the color space region allocated to the palette number groups.

* * * * *